United States Patent
Spink et al.

(10) Patent No.: US 10,823,143 B2
(45) Date of Patent: Nov. 3, 2020

(54) DISK BRAKE FOR A BRAKE DISK RING OF AN AZIMUTH DRIVE OF A WIND TURBINE

(71) Applicant: Stromag GmbH, Unna (DE)

(72) Inventors: Daniela Spink, Unna (DE); Olaf Mikolajczyk, Unna (DE); Friedrich Faust, Ahlen (DE); Peter Böhm, Unna (DE)

(73) Assignee: Stromag GmbH, Unna (DE)

( * ) Notice: Subject to any disclaimer, the term of this patent is extended or adjusted under 35 U.S.C. 154(b) by 31 days.

(21) Appl. No.: 16/319,979

(22) PCT Filed: Jul. 13, 2017

(86) PCT No.: PCT/EP2017/067760
§ 371 (c)(1),
(2) Date: Jan. 24, 2019

(87) PCT Pub. No.: WO2018/019606
PCT Pub. Date: Feb. 1, 2018

(65) Prior Publication Data
US 2019/0264654 A1     Aug. 29, 2019

(30) Foreign Application Priority Data

Jul. 27, 2016   (DE) ........................ 10 2016 213 824

(51) Int. Cl.
| | |
|---|---|
| *F03D 7/02* | (2006.01) |
| *F03D 80/55* | (2016.01) |
| *F16D 65/092* | (2006.01) |
| *F16D 55/225* | (2006.01) |
| *F16D 65/12* | (2006.01) |
| *F16D 65/00* | (2006.01) |
| *F16D 121/04* | (2012.01) |

(52) U.S. Cl.
CPC ......... *F03D 7/0248* (2013.01); *F03D 7/0204* (2013.01); *F03D 7/0244* (2013.01);
(Continued)

(58) Field of Classification Search
CPC .. F16D 55/225; F16D 55/228; F16D 65/0025; F16D 65/0031; F16D 65/0045;
(Continued)

(56) References Cited

U.S. PATENT DOCUMENTS

| | | | |
|---|---|---|---|
| 6,446,766 B1 * | 9/2002 | Cornolti | ................ F16D 55/228 188/264 A |
| 2012/0080276 A1 | 4/2012 | Kahan et al. | |

FOREIGN PATENT DOCUMENTS

| | | |
|---|---|---|
| CN | 102493917 A | 6/2012 |
| CN | 104074891 B | 8/2016 |

(Continued)

OTHER PUBLICATIONS

Examination Report issued in corresponding Indian Patent Application No. 201947006434 (dated Mar. 18, 2020).
(Continued)

*Primary Examiner* — Thomas J Williams
(74) *Attorney, Agent, or Firm* — Reising Ethington P.C.

(57) ABSTRACT

A disk brake for a brake disk ring of an azimuth drive of a wind turbine includes
a brake housing which has two housing halves that, on opposite sides, flank receiving jaws for the brake disk ring. At least two brake pistons which hydraulically act upon friction lining carriers assigned to the receiving jaws are mounted in each housing half.
At least one housing half has a cleaning channel, extending from a rear side of the housing and towards a front housing area, in which the receiving jaws and the friction lining carriers are provided.

20 Claims, 3 Drawing Sheets

(52) U.S. Cl.
CPC ........... *F03D 80/55* (2016.05); *F16D 55/225* (2013.01); *F16D 65/0043* (2013.01); *F16D 65/092* (2013.01); *F16D 65/121* (2013.01); *F05B 2260/902* (2013.01); *F16D 2121/04* (2013.01); *Y02E 10/72* (2013.01)

(58) Field of Classification Search
CPC ............. F16D 65/0068; F16D 65/0075; F16D 2055/0066; F16D 2055/0091; F16D 2055/002; F16D 2055/0016; F03D 7/0248; F03D 7/0244; F03D 80/88
USPC .............................. 188/71.1, 72.1, 72.4, 72.5
See application file for complete search history.

(56) References Cited

FOREIGN PATENT DOCUMENTS

| | | |
|---|---|---|
| DE | 10 2008 008 437 A1 | 8/2009 |
| DE | 10 2009 049 906 A1 | 4/2011 |
| DE | 10 2012 202 438 B3 | 3/2013 |
| EP | 2488750 B2 * | 2/2019 ........... F03D 7/0212 |
| JP | 6613376 B2 * | 11/2019 ......... F16D 65/0043 |
| KR | 101464598 B1 | 11/2014 |
| KR | 2015033805 A * | 4/2015 ........... F03D 7/0244 |
| WO | 2014/187510 A1 | 11/2014 |

OTHER PUBLICATIONS

Examination Report issued in corresponding European Patent Application No. 17739284.2.
English (machine) translation of Examination Report issued in corresponding European Patent Application No. 17739284.2.
International Search Report issued in International (PCT) Patent Application No. PCT/EP2017/067760 (dated Oct. 13, 2017).
English language machine translation of CN 104074891 B.
English language machine translation of DE 10 2009 049 906 A1.
English language machine translation of KR 101464598 B1.

* cited by examiner

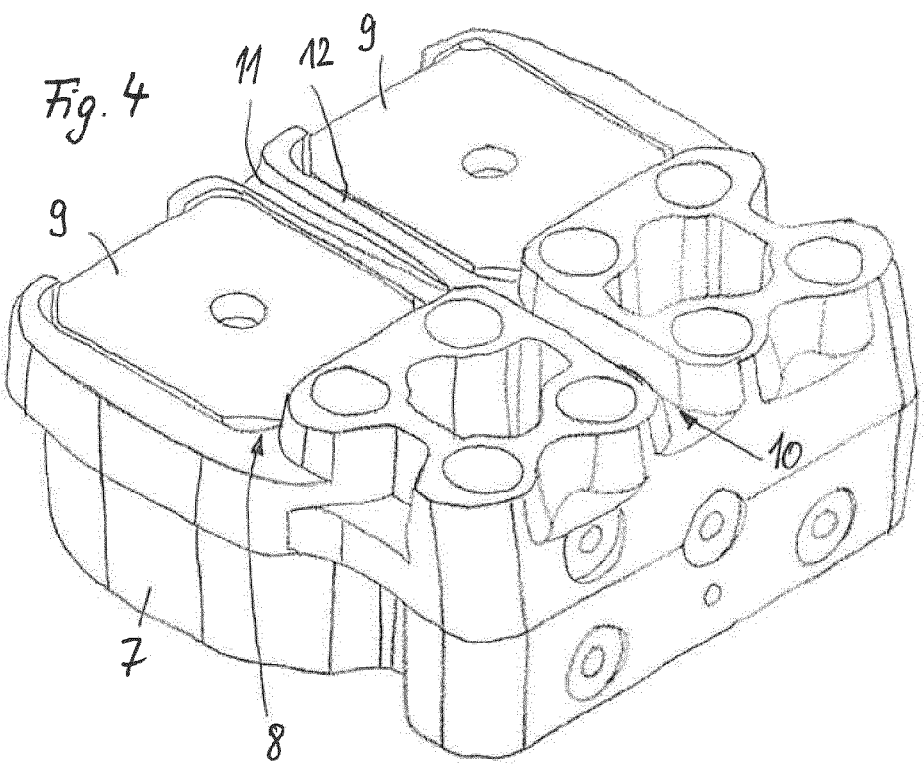
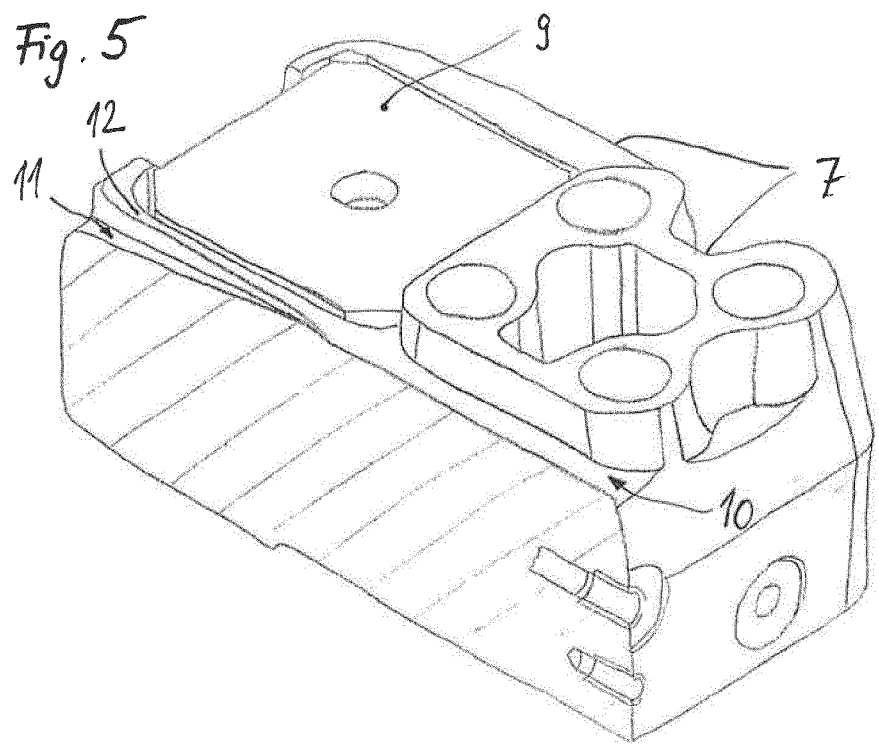

DISK BRAKE FOR A BRAKE DISK RING OF AN AZIMUTH DRIVE OF A WIND TURBINE

CROSS-REFERENCE TO RELATED APPLICATIONS

This application is the national stage application of International Application No. PCT/EP2017/067760, filed Jul. 13, 2017, which designates the United States of America. This application also claims priority, under 35 U.S.C. § 119, to German Patent Application No. DE 2016 213 824.3, filed Jul. 27, 2016. The prior applications are herein incorporated by reference in their entirety.

FIELD OF THE INVENTION

The invention relates to a disk brake for a brake disk ring of an azimuth drive of a wind turbine with a brake housing which has two housing halves which, on opposite sides, flank receiving jaws for the brake disk ring, wherein at least two brake pistons are mounted in each housing half which hydraulically act upon friction lining carriers assigned to the receiving jaws.

BACKGROUND OF THE INVENTION

Such a disk brake is known from DE 10 2009 049 906 A1. The wind turbine has a horizontally rotatable nacelle which is rotated by means of an azimuth drive. In order to lock the nacelle in a desired wind direction, a horizontally arranged brake disk ring is provided which is hydraulically acted upon by a plurality of disk brakes designed identically to one another. Each disk brake has a brake housing which forms receiving jaws for the brake disk ring. The brake housing has two housing halves which, in the mounted state of the disk brake, flank the brake disk ring on the top side and underside. Two brake pistons, which are movable orthogonally to a corresponding surface of the brake disk ring, are arranged in each housing half. The brake pistons act on friction lining carriers which interact with the surfaces of the brake disk ring acting as friction surfaces via corresponding friction linings in order to brake or release the brake disk ring.

SUMMARY OF THE INVENTION

The object of the invention is to provide a disc brake of the aforementioned type which can reduce noise formation during operation.

This object is achieved in that at least one housing half has a cleaning channel, extending from a rear side of the housing towards a front housing area, in which the receiving jaws and the friction lining carriers are provided. The solution according to the invention utilizes the knowledge that squeaking noises during the adjustment of a nacelle of a wind turbine arise due to brake dust in the region of the brake disk ring, said brake dust being caused by frictional wear of the friction linings of the disk brake. The solution according to the invention makes it possible from the rear side of the housing to reach with corresponding cleaning elements into the region of the receiving jaws and consequently into the region of the friction lining carriers in order to remove brake dust there by means of the cleaning elements. The possibility of a removal of brake dust in a gap region of the receiving jaws of the brake housing itself makes it possible to keep the surfaces of the brake disk ring clean and thus to reduce noise formation during operation of the disk brake. The cleaning channel can be formed either only in one housing half or in both housing halves. The cleaning channel is open both towards the rear side of the housing as well as to the front housing area, i.e. towards the receiving jaws, so that a suitable cleaning element can be positioned or pushed through from a rear side to allow cleaning in the front housing area, i.e. in the region of the friction lining carriers and the receiving jaws. The cleaning channel thus represents a passage passing through the superimposed part of the housing halves of the brake housing. In a particularly advantageous manner, at least an upper housing half of the brake housing—with respect to a mounted operating state of the disc brake—is provided with the cleaning channel. Due to the horizontal orientation of the brake disk ring, powdered abrasion wear remains in particular on the upper side of the brake disk ring, which can be removed by the cleaning element. The cleaning channel in the region of the upper housing half is sufficient to make the upper side of the brake disk ring accessible for the cleaning element. A blower, a vacuum cleaner or a mechanical cleaning brush, in particular a bottle brush, is preferably provided as a cleaning element. The corresponding abraded material, which forms between the friction linings and the corresponding surfaces of the brake disk ring, prefers to settle between the adjacent friction lining carriers in each case of one housing half. When the brake disk ring is rotated, this abraded material is pressed between the corresponding friction lining and the brake disk ring which may cause a vitrification of the friction lining. Such a corresponding vitrification of the friction lining leads on the one hand to undesirable squeaking. On the other hand, such vitrified friction linings lose their frictional properties and consequently their braking properties, whereby they must be replaced. By the solution according to the invention, abraded material in the region of the receiving jaws and in particular between the adjacent friction lining carriers can be removed via the cleaning channel, whereby a vitrification of the friction linings can be prevented. Advantageously, the cleaning channel is dimensioned such that the receiving jaws of the brake housing in the region of the upper and lower friction lining carriers are accessible for a corresponding cleaning element from the rear side of the housing.

In an embodiment of the invention, the cleaning channel is provided flush with at least one central bar between two adjacent friction lining carriers. When there are only two adjacent friction lining carriers, a single cleaning channel is provided in the region of the corresponding housing half. With more than two friction lining carriers in the region of each housing half, a correspondingly increased number of cleaning channels is provided in the region of the central bars in each case between two adjacent friction lining carriers.

In a further embodiment of the invention, the cleaning channel continues in the region of the receiving jaws into a cleaning groove which is open towards a front side of the housing. This makes it possible to convey towards the front side of the housing, in particular, push out, the abraded material that has collected between the friction lining carriers in the region of the central bar and thus in the region of the receiving jaws, from the rear side of the housing by means of a corresponding cleaning brush. In so doing, the cleaning brush is passed from behind through the cleaning channel and then moved back and forth in the region of the receiving jaws. Alternatively or additionally, by means of a pressure or suction fan mounted at the rear on an open face of the cleaning channel, a suction or compressed air stream is created which effects the desired dust removal.

In a further embodiment of the invention, the cleaning groove, in the direction of the front side of the housing, has an inclination relative to a horizontal plane in which the friction lining carriers are arranged, wherein a bottom of the cleaning groove towards the front side of the housing departs from the horizontal plane. As a result, a downward slope is formed like a slide, which enables further improved removal of brake dust, i.e., abraded material, from the region of the central bar in each case between two friction lining carriers.

In a further embodiment of the invention, a cross-sectional area of the cleaning groove increases continuously towards the front side of the housing. An enlargement of the cross-sectional area of the cleaning groove is achieved in particular by a continuous enlargement of the width of a bottom of the cleaning groove towards the front side of the housing, whereby a slide functionality for the abraded material swept into the cleaning groove is further improved.

In a further embodiment of the invention, the cleaning groove is trough-shaped. By means of a cleaning brush, the abraded material accumulating between the friction lining carriers can thus be swept into the cleaning groove and easily swept out towards the front side of the housing.

In a further embodiment of the invention, both housing halves together form the cleaning channel, and in the region of the receiving jaws, a cleaning groove is provided in each case in both housing halves. The cleaning channel transitions into the corresponding cleaning groove flush therewith.

In a further embodiment of the invention, both cleaning grooves are designed mirror-symmetrically to a horizontal parting plane of the housing halves and are each provided with an inclination. The cleaning grooves, as well as the at least one cleaning channel, are integrally formed in the brake housing, in particular in the two housing halves.

BRIEF DESCRIPTION OF THE DRAWINGS

Further advantages and features of the invention result from the claims and also from the following description of a preferred exemplary embodiment of the invention, which is illustrated with reference to the drawings.

FIG. 4 shows a lower half of the disk brake according to FIG. 3 and FIG. 5 shows, in a perspective longitudinal sectional view, the lower brake half according to FIG. 4.

DETAILED DESCRIPTION OF THE PREFERRED EMBODIMENTS

Figure 1:
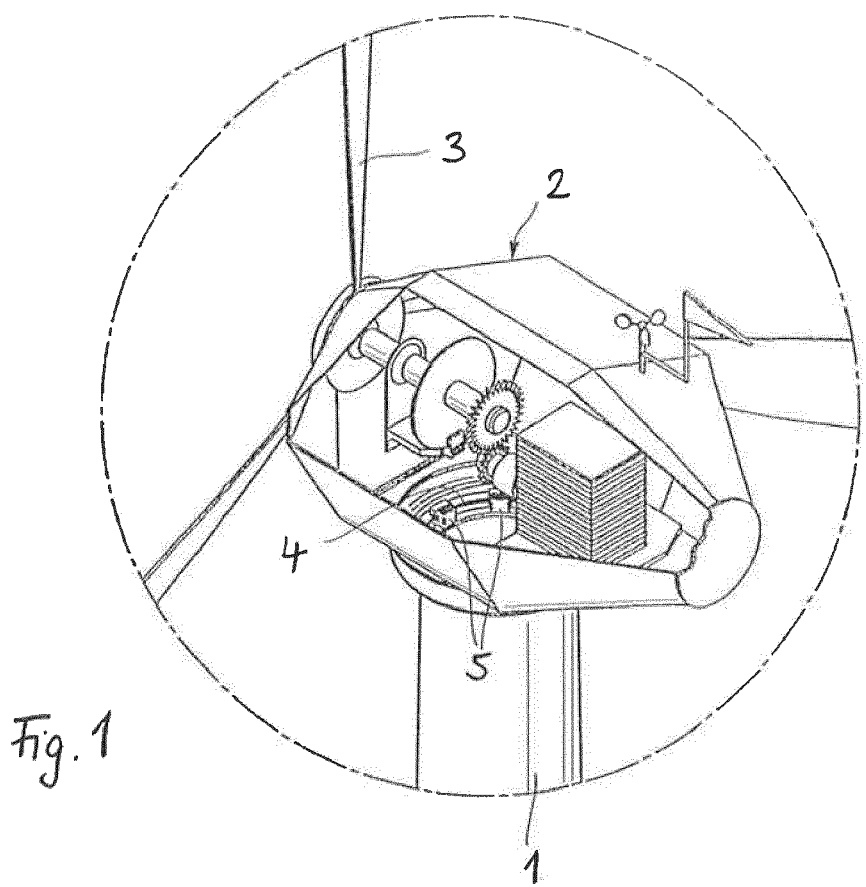
FIG. 1 schematically shows a section of a wind turbine in the region of a rotatable nacelle with embodiments of disk brakes according to the invention, FIG. 2 schematically shows in a plan view one-half of a brake disk ring with a plurality of disk brakes according to an embodiment of the invention.

A wind turbine according to FIG. 1 comprises a stationary tower 1 which is mounted on a base and projects vertically upward from the base. At an upper end region of the tower 1, a nacelle 2 is rotatably mounted about a vertical central longitudinal axis of the tower 1. The nacelle 2 bears a rotor 3 which acts upon an electrical generator in the interior of the nacelle 2 via a gearbox.

Figure 2:
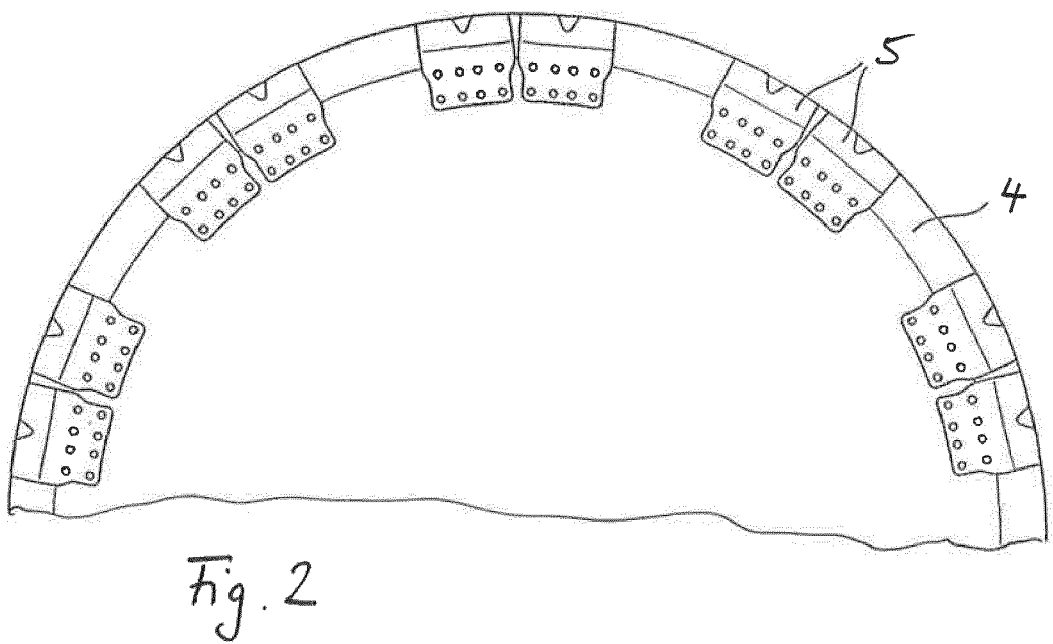
Figure 3:
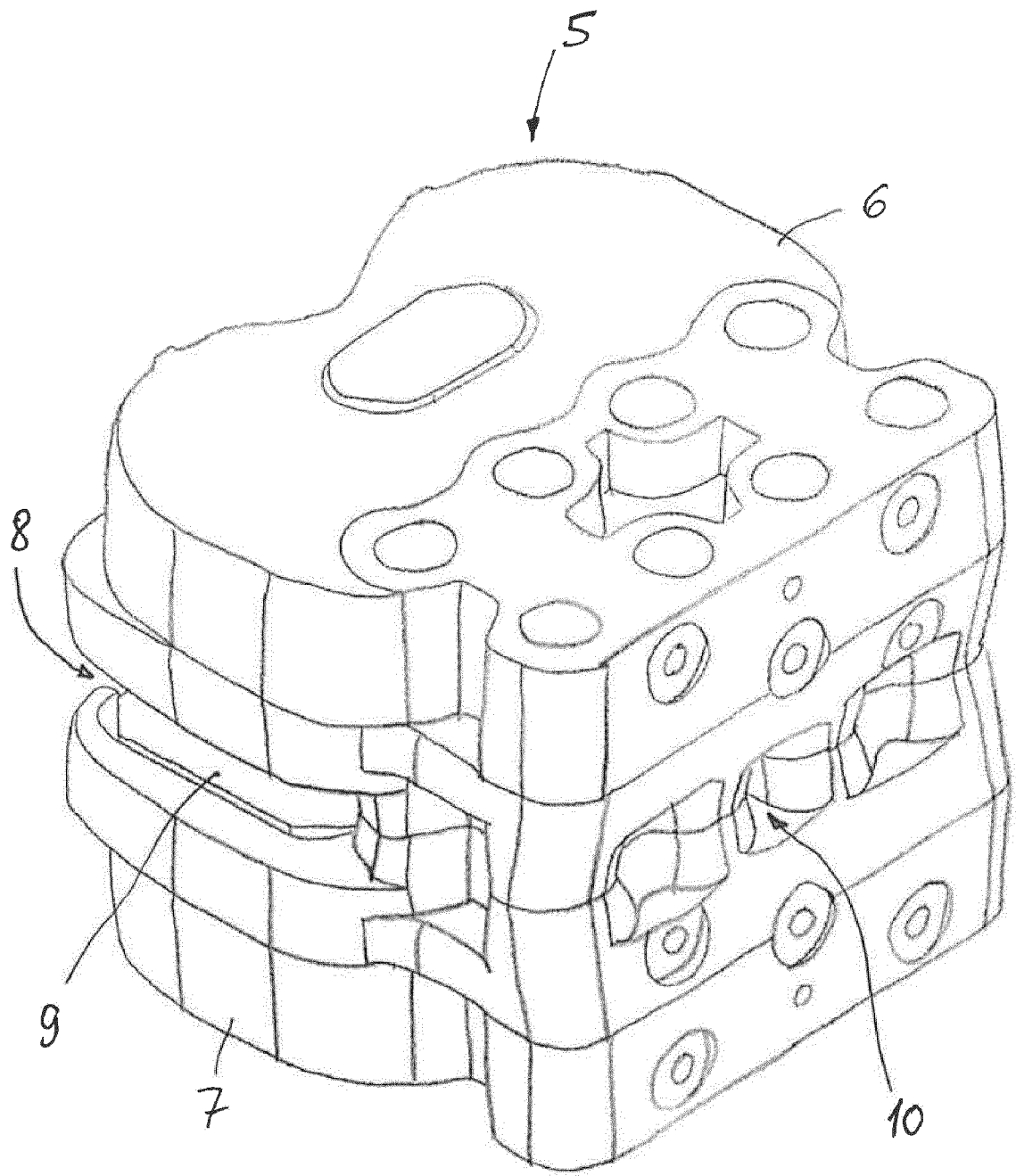
FIG. 3 shows, in an enlarged perspective view, an embodiment of a disk brake according to the invention according to FIGS. 1 and 2.

The nacelle 2 is made to rotate by an azimuth drive, which is not shown in greater detail. In this case, the nacelle 2 is oriented relative to the corresponding wind direction in such a way that the rotor 3 is always directed into the wind. To secure the set particular rotational position, a horizontally aligned brake disc ring 4 that is rotationally fixed to the nacelle 2 is assigned to the nacelle. A plurality of disk brakes 5 (FIG. 2), which are arranged distributed around the circumference of the brake disk ring 4 and which are unmovably fixed to the tower 1, engages with the brake disk ring 4. Each disk brake 5 can be actuated hydraulically and, according to FIGS. 3 to 5, has a brake housing which is composed of two housing halves 6 and 7. The two housing halves 6 and 7 are mirror-symmetrical with respect to a central horizontal plane, but are otherwise identical to one another. The two housing halves 6 and 7 have a rear housing area in which the housing halves 6 and 7 lie on top of each other and are firmly connected to each other via threaded connections (not shown). In addition, the two housing halves 6 and 7 are also spaced apart from each another in a front housing area, thereby forming receiving jaws 8. The receiving jaws 8 form a gap, extending over the entire width of the brake housing into the front housing area and open on three sides, through which the brake disk ring 4 is passed. The two housing halves 6 and 7 accordingly flank the brake disk ring 4 in parallel in the region of its upper side and in the region of its underside.

In the two housing halves 6 and 7, two brake pistons in each case are mounted so as to execute strokes and, in the region of the receiving jaws 8, act in each case on a friction lining carrier 9 which is clamped in a corresponding receiving area of the respective housing half 6, 7. When pressure is applied by means of an associated brake piston, the respective friction lining carriers 9 are pressed against the corresponding surface of the brake disk ring. Each friction lining carrier 9 bears a friction lining in a manner not shown in greater detail. The two friction lining carriers 9 of in each case one housing half 6, 7 are acted upon in pairs synchronously by the respective pair of brake pistons. The pairwise opposing brake pistons in the two housing halves 6 and 7 are synchronously movable in opposite directions to each other so that a simultaneous pressing of the friction linings against the top and bottom sides of the brake disk ring 4 takes place when the disc brake is correspondingly hydraulically actuated. Between the two friction lining carriers 9 of a housing half 6, 7, the corresponding housing half 6, 7 has a central bar 12 which separates from one another the two receiving spaces for the two friction lining carriers 9 of the respective housing halves 6, 7.

In the region of a horizontal parting plane of the two housing halves 6, 7, which also forms a horizontal central plane of the receiving jaws 8, the two housing halves 6, 7 contact each other in their rear housing area. This rear housing area is provided with a cleaning channel 10 located centrally and flush with the central bar 12 of the front housing area, said cleaning channel being open both to the front towards to receiving jaws 8 and to the rear to a rear side of the housing. The cleaning channel 10 is formed in each case by an open channel section in the respective housing half 6, 7, wherein the open channel sections are designed mirror-symmetrically with respect to the parting plane but are otherwise identical to each another. The closed cleaning channel 10 in the rear housing area which has a rectangular free cross-section is formed by superpositioning the two housing halves 6 and 7.

In addition, in the region of the central bar 12 between the two friction lining carriers 9 in the front housing area, a cleaning groove 11 is provided in each housing half 6, 7 which is flush with the cleaning channel 10 and is inclined towards a front side of the housing, i.e., away from the cleaning channel 10. In so doing, the cleaning groove 11 is formed in the area of the lower housing half 7 so as to slope continuously downwards toward the front side of the housing, thereby yielding the functionality of a slide. The complementary cleaning groove in the region of the upper housing half 6 rises relative to the horizontal parting plane towards the front side of the housing, namely mirror-symmetrically to the slope of the cleaning groove 11 in the lower housing half 7. Towards the front side of the housing, the cleaning groove 11 also widens on both sides in the manner of a funnel, whereby the free cross-section of the cleaning groove 11 also necessarily increases towards the front side of the housing. On the basis of FIGS. 4 and 5, it is apparent that the cleaning groove 11 is trough-like in form with a bottom and two side walls in the region of the central bar 12. The bottom falls continuously frontwards towards the front side of the housing, which necessarily increases the height of the two side walls towards the front side of the housing. This is because the central bar 12 having an edge region which remains parallel to the horizontal parting plane.

During operation of the disk brake 5, as soon as brake dust, i.e. abraded material, settles in the region of the receiving jaws 8 between the friction lining carriers 9, i.e., in the region of the central bar 12, this brake dust can be pushed out or swept out towards the front side of the housing by means of a cleaning brush which is introduced into the cleaning channel 10 from a rear side of the housing and pushed forward to the central bar 12. The brake dust is thereby pushed into the cleaning groove 11. Since the cleaning groove 11 widens towards the front side of the housing, a particularly simple removal of the brake dust towards the front side of the housing is made possible.

The corresponding cleaning brush is dimensioned such that it can be pushed manually by a corresponding operator through the cleaning channel 10 both above and below the brake disk ring to the respective central bar 12 of the upper housing half 6 or of the lower housing half 7. This ensures that corresponding abraded material can be removed both in the region of the upper housing half 6 and in the region of the lower housing half 7.

Both the cleaning channel 10 and the cleaning grooves 11 are integrally formed in the two housing halves 6, 7, in each case during the production of the housing halves. The corresponding channel sections of the cleaning channel 10 and the cleaning grooves 11 are preferably already provided in a casting tool for producing the housing halves 6, 7 so that the channel sections for the cleaning channel 10 and the cleaning grooves 11 are introduced as metal castings directly after the completion of the housing halves 6 and 7 without additional machining.

The invention claimed is:

1. Disk brake for a brake disk ring (4) of an azimuth drive of a wind turbine, with a brake housing which has two housing halves (6, 7) that, on opposite sides, flank receiving jaws (8) for the brake disk ring (4), wherein at least two brake pistons are mounted in each housing half (6, 7) and hydraulically act upon a friction lining carrier (9) assigned to the receiving jaws (8), characterized in that at least one housing half (7) has a cleaning channel (10) extending from a rear side of the housing to a front housing area in which the receiving jaws (8) and the friction lining carriers (9) are provided
characterized in that the cleaning channel (10) is provided flush with at least one central bar (12) between two adjacent friction lining carriers (9).

2. Disk brake according to claim 1 wherein the cleaning channel (10) continues in the region of the receiving jaws (8) into a cleaning groove (11) which is open towards a front side of the housing.

3. Disk brake according to claim 2, characterized in that the cleaning groove (11), in the direction of the front side of the housing, has an inclination relative to a horizontal plane in which the friction lining carriers (9) are arranged, wherein a bottom of the cleaning groove (11) departs from the horizontal plane towards the front side of the housing.

4. Disk brake according to claim 2, characterized in that a cross-sectional area of the cleaning groove (11) increases continuously towards the front side of the housing.

5. Disk brake according to claim 2, characterized in that the cleaning groove (11) has the shape of a trough.

6. Disk brake according to claim 1, characterized in that both housing halves (6, 7) together form the cleaning channel (10), and that a cleaning groove (11) is provided in each case in the region of the receiving jaws (8) in both housing halves (6, 7).

7. Disk brake according to claim 6, characterized in that both cleaning grooves (11) are designed mirror-symmetrically to a horizontal parting plane of the housing halves (6, 7) and are each provided with an inclination.

8. Disk brake for a brake disk ring (4) of an azimuth drive of a wind turbine, with a brake housing which has two housing halves (6, 7) that, on opposite sides, flank receiving jaws (8) for the brake disk ring (4), wherein at least two brake pistons are mounted in each housing half (6, 7) and hydraulically act upon a friction lining carrier (9) assigned to the receiving jaws (8), characterized in that at least one housing half (7) has a cleaning channel (10) extending from, and open towards, a rear side of the housing to a front housing area in which the receiving jaws (8) and the friction lining carriers (9) are provided wherein the cleaning channel (10) continues in the region of the receiving jaws (8) into a cleaning groove (11) formed in at least one of the receiving jaws (8) which is open towards a front side of the housing
characterized in that the cleaning groove (11), in the direction of the front side of the housing, has an inclination relative to a horizontal plane in which the friction lining carriers (9) are arranged, wherein a bottom of the cleaning groove (11) departs from the horizontal plane towards the front side of the housing.

9. Disk brake according to claim 8, characterized in that the cleaning groove (11) has the shape of a trough.

10. Disk brake according to claim 8, characterized in that both housing halves (6, 7) together form the cleaning channel (10), and that the cleaning groove is provided in each case in the region of the receiving jaws (8) in both housing halves (6, 7).

11. Disk brake according to claim 8 wherein the cleaning channel (10) is open on one side.

12. Disk brake for a brake disk ring (4) of an azimuth drive of a wind turbine, with a brake housing which has two housing halves (6, 7) that, on opposite sides, flank receiving jaws (8) for the brake disk ring (4), wherein at least two brake pistons are mounted in each housing half (6, 7) and hydraulically act upon a friction lining carrier (9) assigned to the receiving jaws (8), characterized in that at least one housing half (7) has a cleaning channel (10) extending from, and open towards, a rear side of the housing to a front housing area in which the receiving jaws (8) and the friction lining carriers (9) are provided wherein the cleaning channel (10) continues in the region of the receiving jaws (8) into a cleaning groove (11) formed in at least one of the receiving jaws (8) which is open towards a front side of the housing characterized in that a cross-sectional area of the cleaning groove (11) increases continuously towards the front side of the housing.

13. Disk brake according to claim 12, characterized in that the cleaning groove (11) has the shape of a trough.

14. Disk brake according to claim 12, characterized in that both housing halves (6, 7) together form the cleaning channel (10), and that the cleaning groove is provided in each case in the region of the receiving jaws (8) in both housing halves (6, 7).

15. Disk brake according to claim 12 wherein the cleaning channel (10) is open on one side.

16. Disk brake for a brake disk ring (4) of an azimuth drive of a wind turbine, with a brake housing which has two housing halves (6, 7) that, on opposite sides, flank receiving jaws (8) for the brake disk ring (4), wherein at least two brake pistons are mounted in each housing half (6, 7) and hydraulically act upon a friction lining carrier (9) assigned to the receiving jaws (8), characterized in that at least one housing half (7) has a cleaning channel (10) extending from a rear side of the housing to a front housing area in which the receiving jaws (8) and the friction lining carriers (9) are provided characterized in that both housing halves (6, 7) together form the cleaning channel (10), and that a cleaning groove (11) is provided in each case in the region of the receiving jaws (8) in both housing halves (6, 7) characterized in that both cleaning grooves (11) are designed mirror-symmetrically to a horizontal parting plane of the housing halves (6, 7) and are each provided with an inclination.

17. Disk brake according to claim 16 wherein the cleaning channel (10) continues in the region of the receiving jaws (8) into the cleaning groove (11) which is open towards a front side of the housing.

18. Disk brake according to claim 17, characterized in that the cleaning groove (11), in the direction of the front side of the housing, has an inclination relative to a horizontal plane in which the friction lining carriers (9) are arranged, wherein a bottom of the cleaning groove (11) departs from the horizontal plane towards the front side of the housing.

19. Disk brake according to claim 17, characterized in that a cross-sectional area of the cleaning groove (11) increases continuously towards the front side of the housing.

20. Disk brake according to claim 17, characterized in that the cleaning groove (11) has the shape of a trough.

\* \* \* \* \*